(12) United States Patent
Abhyankar et al.

(10) Patent No.: US 6,757,789 B2
(45) Date of Patent: Jun. 29, 2004

(54) APPARATUS AND METHOD FOR MAXIMIZING INFORMATION TRANSFERS OVER LIMITED INTERCONNECT RESOURCES

(75) Inventors: Abhijit M. Abhyankar, Sunnyvale, CA (US); Frederick A. Ware, Los Altos Hills, CA (US); Donald C. Stark, Los Altos, CA (US); Craig E. Hampel, San Jose, CA (US); Paul G. Davis, San Jose, CA (US)

(73) Assignee: Rambus, Inc., Los Altos, CA (US)

( * ) Notice: Subject to any disclaimer, the term of this patent is extended or adjusted under 35 U.S.C. 154(b) by 0 days.

(21) Appl. No.: 10/066,488

(22) Filed: Jan. 30, 2002

(65) Prior Publication Data

US 2002/0156985 A1 Oct. 24, 2002

Related U.S. Application Data

(62) Division of application No. 09/169,748, filed on Oct. 9, 1998, now Pat. No. 6,347,354.
(60) Provisional application No. 60/063,471, filed on Oct. 10, 1997.

(51) Int. Cl.[7] .............................................. G06F 12/00
(52) U.S. Cl. ..................... 711/145; 711/154; 711/220; 711/133; 712/224; 712/229
(58) Field of Search ............................... 711/125, 126, 711/133, 154, 220, 144, 145; 712/43, 229, 224

(56) References Cited

U.S. PATENT DOCUMENTS

| | | | | |
|---|---|---|---|---|
| 4,852,049 A | * | 7/1989 | Sakai | 711/214 |
| 4,977,498 A | * | 12/1990 | Rastegar et al. | 711/128 |
| 5,430,676 A | | 7/1995 | Ware et al. | 365/189.02 |
| 5,640,528 A | * | 6/1997 | Harney et al. | 711/206 |
| 5,809,263 A | | 9/1998 | Farmwald et al. | 710/129 |
| 5,911,153 A | * | 6/1999 | Dhong et al. | 711/218 |
| 5,983,320 A | | 11/1999 | Farmwald et al. | 711/114 |
| 6,055,615 A | | 4/2000 | Okajima | 711/169 |
| 6,088,760 A | * | 7/2000 | Walker et al. | 711/104 |

OTHER PUBLICATIONS

Samsung electronics, "Direct RDRAM", Nov. 2000, p. 1–18.

Rambus Inc., "Direct Rambus Technology disclosure", Oct. 15, 1997, p. 3–16.

* cited by examiner

*Primary Examiner*—Donald Sparks
*Assistant Examiner*—Brian R. Peugh
(74) *Attorney, Agent, or Firm*—Morgan Lewis & Bockius LLP

(57) ABSTRACT

The present invention provides various techniques for optimized transfer of information in electronic systems involving memory devices to improve data bandwidth. The invention offers solutions to the problem of packing all of the required information including data, control and address information over a limited number of interconnect lines in an optimized fashion. In one embodiment, the present invention combines different control information, such as row address and bank address information into a unified address field wherein one or more bits can be shared. By sharing bits across various address fields, the present invention conserves bandwidth that is required by the control signals. In another embodiment, the present invention provides various schemes for defining and constructing packets of information that maximize the amount of information carried by a given packet across a limited number of interconnect lines.

26 Claims, 7 Drawing Sheets

Secondary Control Packet Bit Details, Masking (M=1)

| | RQ[4] | RQ[3] | RQ[2] | RQ[1] | RQ[0] |
|---|---|---|---|---|---|
| Cycle 0 | DC[4] | DC[3] | DC[2] | DC[1] | DC[0] |
| | S=1 | M=1 | COP[1] | COP[0] | PC |
| Cycle 1 | MA[7] | MA[6] | MB[7] | MB[6] | MB[5] |
| | MA[5] | MA[4] | MB[4] | MB[3] | MB[2] |
| Cycle 2 | MA[3] | MA[2] | MB[1] | MB[0] | RC |
| | MA[1] | MA[0] | BC[5] | BC[4] | BC[3] |
| Cycle 3 | AC[6] | AC[5] | BC[2] | BC[1] | BC[0] |
| | AC[4] | AC[3] | AC[2] | AC[1] | AC[0] |

FIG. 2

|  |  | Cycle 0 | | Cycle 1 | | Cycle 2 | | Cycle 3 | |
|---|---|---|---|---|---|---|---|---|---|
| PCP | RQ[7] | Bit 0 | Bit 3 | Bit 6 |  |  |  |  | Bit 22 |
| | RQ[6] | Bit 1 | Bit 4 |  | Bit 10 | Bit 13 |  |  | Bit 22 |
| | RQ[5] | Bit 2 | Bit 5 |  |  |  | Bit 20 |  | Bit 23 |
| SCP | | Bit 0 | Bit 5 |  | Bit 15 |  |  |  | Bit 35 |
| | | Bit 1 | Bit 6 |  |  |  | Bit 21 |  | Bit 36 |
| | | Bit 2 | Bit 7 | Bit 12 |  |  |  |  | Bit 37 |
| | | Bit 3 | Bit 8 |  |  |  |  |  | Bit 38 |
| | | Bit 4 | Bit 9 | Bit 14 |  |  |  |  | Bit 39 |

| Bank Bite | 3 | | | 4 | | | | 5 | | | | 6 | | |
|---|---|---|---|---|---|---|---|---|---|---|---|---|---|---|
| Row Bits | 10 | 11 | 12 | 9 | 10 | 11 | 12 | 9 | 10 | 11 | 12 | 9 | 10 | 11 |
| A[16] | b[0] | b[0] | b[0] | b[0] | b[0] | b[0] | b[0] | b[0] | b[0] | b[0] | b[0] | b[0] | b[0] | b[0] |
| A[15] | b[1] | b[1] | b[1] | b[1] | b[1] | b[1] | b[1] | b[1] | b[1] | b[1] | b[1] | b[1] | b[1] | b[1] |
| A[14] | b[2] | b[2] | b[2] | b[2] | b[2] | b[2] | b[2] | b[2] | b[2] | b[2] | b[2] | b[2] | b[2] | b[2] |
| A[13] |  |  |  | b[3] | b[3] | b[3] | b[3] | b[3] | b[3] | b[3] | b[3] | b[3] | b[3] | b[3] |
| A[12] |  |  |  |  |  |  |  | b[4] | b[4] | b[4] | b[4] | b[4] | b[4] | b[4] |
| A[11] |  |  | r[11] |  |  |  | r[11] |  |  |  | r[11] | b[5] | b[5] | b[5] |
| A[10] |  | r[10] | r[10] |  |  | r[10] | r[10] |  |  | r[10] | r[10] |  |  | r[10] |
| A[9] | r[9] | r[9] | r[9] |  | r[9] | r[9] | r[9] |  | r[9] | r[9] | r[9] |  | r[9] | r[9] |
| A[8] | r[8] | r[8] | r[8] | r[8] | r[8] | r[8] | r[8] | r[8] | r[8] | r[8] | r[8] | r[8] | r[8] | r[8] |
| A[7] | r[7] | r[7] | r[7] | r[7] | r[7] | r[7] | r[7] | r[7] | r[7] | r[7] | r[7] | r[7] | r[7] | r[7] |
| A[6] | r[6] | r[6] | r[6] | r[6] | r[6] | r[6] | r[6] | r[6] | r[6] | r[6] | r[6] | r[6] | r[6] | r[6] |
| A[5] | r[5] | r[5] | r[5] | r[5] | r[5] | r[5] | r[5] | r[5] | r[5] | r[5] | r[5] | r[5] | r[5] | r[5] |
| A[4] | r[4] | r[4] | r[4] | r[4] | r[4] | r[4] | r[4] | r[4] | r[4] | r[4] | r[4] | r[4] | r[4] | r[4] |
| A[3] | r[3] | r[3] | r[3] | r[3] | r[3] | r[3] | r[3] | r[3] | r[3] | r[3] | r[3] | r[3] | r[3] | r[3] |
| A[2] | r[2] | r[2] | r[2] | r[2] | r[2] | r[2] | r[2] | r[2] | r[2] | r[2] | r[2] | r[2] | r[2] | r[2] |
| A[1] | r[1] | r[1] | r[1] | r[1] | r[1] | r[1] | r[1] | r[1] | r[1] | r[1] | r[1] | r[1] | r[1] | r[1] |
| A[0] | r[0] | r[0] | r[0] | r[0] | r[0] | r[0] | r[0] | r[0] | r[0] | r[0] | r[0] | r[0] | r[0] | r[0] |

FIG. 3

| | RQ[4] | RQ[3] | RQ[2] | RQ[1] | RQ[0] | |
|---|---|---|---|---|---|---|
| | S3=1 | x | x | x | x | Cycle 0 |
| | x | x | x | x | x | |
| | S2=0 | x | x | x | x | Cycle 1 |
| | x | x | x | x | x | |
| | S1=0 | x | x | x | x | Cycle 2 |
| | x | x | x | x | x | |
| | S0=0 | x | x | x | x | Cycle 3 |
| | x | x | x | x | x | |

FIG. 5

| RQ[4] | RQ[3] | RQ[2] | RQ[1] | RQ[0] | |
|---|---|---|---|---|---|
| S3=1 | x | x | x | x | Cycle 0 |
| x | x | x | x | x | |
| S2=0 | x | x | x | x | Cycle 1 |
| x | x | x | x | x | |
| S1=0 | x | x | x | x | Cycle 2 |
| x | x | x | x | x | |
| S0=0 | x | x | x | x | Cycle 3 |
| x | x | x | x | x | |

FIG. 6

Secondary Control Packet Bit Details, Masking (M=1)

| | RQ[4] | RQ[3] | RQ[2] | RQ[1] | RQ[0] |
|---|---|---|---|---|---|
| Cycle 0 | DC[4] | DC[3] | DC[2] | DC[1] | DC[0] |
| | S=1 | M=1 | COP[1] | COP[0] | PC |
| Cycle 1 | MA[7] | MA[6] | MB[7] | MB[6] | MB[5] |
| | MA[5] | MA[4] | MB[4] | MB[3] | MB[2] |
| Cycle 2 | MA[3] | MA[2] | MB[1] | MB[0] | RC |
| | MA[1] | MA[0] | BC[5] | BC[4] | BC[3] |
| Cycle 3 | AC[6] | AC[5] | BC[2] | BC[1] | BC[0] |
| | AC[4] | AC[3] | AC[2] | AC[1] | AC[0] |

FIG. 9a

Secondary Control Packet Bit Details, No Masking (M=0)

| | RQ[4] | RQ[3] | RQ[2] | RQ[1] | RQ[0] |
|---|---|---|---|---|---|
| Cycle 0 | DC[4] | DC[3] | DC[2] | DC[1] | DC[0] |
| | S=1 | M=0 | COP[1] | COP[0] | PC |
| Cycle 1 | DX[4] | DX[3] | DX[2] | DX[1] | DX[0] |
| | XOP[4] | XOP[3] | XOP[2] | XOP[1] | XOP[0] |
| Cycle 2 | BX[5] | BX[4] | BX[3] | BX[2] | RC |
| | BX[1] | BX[0] | BC[5] | BC[4] | BC[3] |
| Cycle 3 | AC[6] | AC[5] | BC[2] | BC[1] | BC[0] |
| | AC[4] | AC[3] | AC[2] | AC[1] | AC[0] |

FIG. 9b

Primary Control Packet Fields, AV=0

|  | RQ[7] | RQ[6] | RQ[5] |
|---|---|---|---|
| Cycle 0 | D4T | D4F | D[3] |
|  | D[2] | D[1] | D[0] |
| Cycle 1 | A[16] | A[15] | A[14] |
|  | A[13] | A[12] | A[11] |
| Cycle 2 | OP[10] | OP[9] | AV=0 |
|  | OP[8] | OP[7] | OP[6] |
| Cycle 3 | OP[5] | OP[4] | OP[3] |
|  | OP[2] | OP[1] | OP[0] |

FIG. 10a

Primary Control Packet Fields, AV=1

|  | RQ[7] | RQ[6] | RQ[5] |
|---|---|---|---|
| Cycle 0 | D4T | D4F | D[3] |
|  | D[2] | D[1] | D[0] |
| Cycle 1 | A[16] | A[15] | A[14] |
|  | A[13] | A[12] | A[11] |
| Cycle 2 | A[10] | A[9] | AV=1 |
|  | A[8] | A[7] | A[6] |
| Cycle 3 | A[5] | A[4] | A[3] |
|  | A[2] | A[1] | A[0] |

FIG. 10b

Setting Compressed Device Identifiers

| RQ[7] | RQ[6] | RQ[5] | RQ[4] |  |
|---|---|---|---|---|
| x | x | D[4] | D[3] | Cycle 0 |
| D[2] | D[1] | D[0] | x |  |
| CD[2] | CD[1] | CD[0] | x | Cycle 1 |
| x | x | x | x |  |
| x | x | x | x | Cycle 2 |
| x | x | x | x |  |
| x | x | x | x | Cycle 3 |
| x | x | x | x |  |

FIG. 11a

Setting Compressed Device Identifier

| RQ[3] | RQ[2] | RQ[1] | RQ[0] |  |
|---|---|---|---|---|
| x | CD[2] | CD[1] | CD[0] | Cycle 0 |
| x | x | x | x |  |
| x | x | x | x | Cycle 1 |
| x | x | x | x |  |
| x | x | x | x | Cycle 2 |
| x | x | x | x |  |
| x | x | x | x | Cycle 3 |
| x | x | x | x |  |

FIG. 11b

APPARATUS AND METHOD FOR MAXIMIZING INFORMATION TRANSFERS OVER LIMITED INTERCONNECT RESOURCES

This is a divisional of application No. 09/169,748, filed Oct. 9, 1998 now U.S. Pat. No. 6,347,354, which claims priority to provisional application No. 60/063,471, filed Oct. 10, 1997.

This application claims priority to the provisional application entitled, "Techniques for Maximizing Information Transferred Over Limited Interconnect Resources in Electronic Systems", Ser. No. 60/063,471, filed on Oct. 10, 1997.

BACKGROUND OF THE INVENTION

1. Field of the Invention

This invention relates generally to electronic systems involving memory devices. More particularly, this invention relates to various techniques to optimize information transfers over interconnect resources in such systems.

2. Description of the Related Art

The design and fabrication technology of semiconductor memory devices has evolved rapidly over the past decade. In the case of dynamic random access memories (DRAMs), for example, the number of bits of data stored in a single DRAM chip has increased by a factor of four roughly every three years. This has resulted in the doubling of the size of memory systems at the same rate. Each new higher density generation of DRAMs reduces the number of individual memory chips needed in a system by one half. Fewer (but higher density) individual DRAM chips in memory systems results in fewer total number of pins available for transfer of data within the system. Reducing the number of pins available for receiving and transmitting information decreases the bandwidth of the memory system. That is, while internal to the memory chip large numbers of bits can be accessed per cycle, only a small percentage of the data can make it across the device boundary to the external world in any given time interval.

Today's advanced computing systems and microprocessors, however, demand greater and greater data bandwidths from memory systems. This has resulted in a more concerted effort in the memory industry to devise solutions to the bandwidth bottleneck. One approach to improving the data bandwidth in memory systems has focused on designing high speed interface structures. A memory sub-system based on a very fast and efficient interface technology that exploits a number of innovative data transmission techniques is described in U.S. Pat. No. 5,319,755 (Farmwald et al.) and U.S. Pat. No. 5,430,676 (Ware et al.). Other prior art approaches have focused more on the internal circuitry of the memory devices to increase the rate of data transfer.

While prior art techniques have improved the data bandwidth of memory systems, there is a need for further improvement as the demand for ever greater data bandwidth continues to grow.

SUMMARY OF THE INVENTION

The present invention provides various techniques for optimized transfer of information in electronic systems involving memory devices to increase data bandwidth. Broadly, the invention offers solutions to the problem of packing all of the required information including data, control and address information over a limited number of interconnect wires in an optimized fashion. In one embodiment, the present invention combines different address information such as row address and bank address information into a unified address field wherein one or more bits can be shared. By sharing bits across various address fields, the present invention conserves bandwidth that is required by the control signals. In another embodiment, the present invention provides various schemes for defining and constructing packets of information that maximize the amount of information carried by a given packet across a limited number of interconnect wires.

Accordingly, in one embodiment, the present invention provides an electronic system including a master controller and at least one memory device coupled to the master controller via an interconnect structure, with the interconnect structure having a multi-wire bus for carrying control information from the master controller to the memory device, wherein, the control information comprises control information of a first type and control information of a second type, and wherein, the control information of the first type is merged with the control information of the second type to form a combined control information field requiring fewer interconnect wires.

In another embodiment, the present invention provides an electronic system including a master controller and at least one memory device coupled to the master controller via an interconnect structure, with the interconnect structure having a multi-wire bus for carrying control information from the master controller to the memory device, wherein the memory device comprises framing circuitry to establish framing of a first group of signals in relation to framing information from a second group of signals.

BRIEF DESCRIPTION OF THE DRAWINGS

For a better understanding of the invention, reference should be made to the following detailed description taken in conjunction with the accompanying drawings, in which:

FIG. 2 depicts a generalized version of an exemplary frame of data defining the relationship in time across wires for two control packets;

FIG. 3 provides a table that illustrates one example of address field compression according to one embodiment of the present invention for several different memory device configurations;

FIG. 5 shows one example of a control packet with a relatively simple mechanism to establish framing;

FIG. 6 shows another control packet illustrating an alternative, more bandwidth efficient framing scheme;

FIGS. 9a and 9b illustrate exemplary packings for a control packet with a mask field with mask address, and control packet with the mask field packed with extra opcodes, respectively, according to one embodiment of the present invention;

FIG. 10a shows one example of field positioning for a primary control packet PCP wherein a row is not activated;

FIG. 10b shows an exemplary field positioning for a PCP wherein a row is activated;

FIG. 11a shows one example of a control packet with an exemplary 5-bit device address field, which establishes a 3-bit tag for a compressed device identifier; and FIG. 11b shows another control packet that uses the 3-bit tag in the compressed device identifier field to save bit positions.

Like reference numerals refer to corresponding parts throughout the drawings.

DESCRIPTION OF THE PREFERRED EMBODIMENTS

Figure 1:
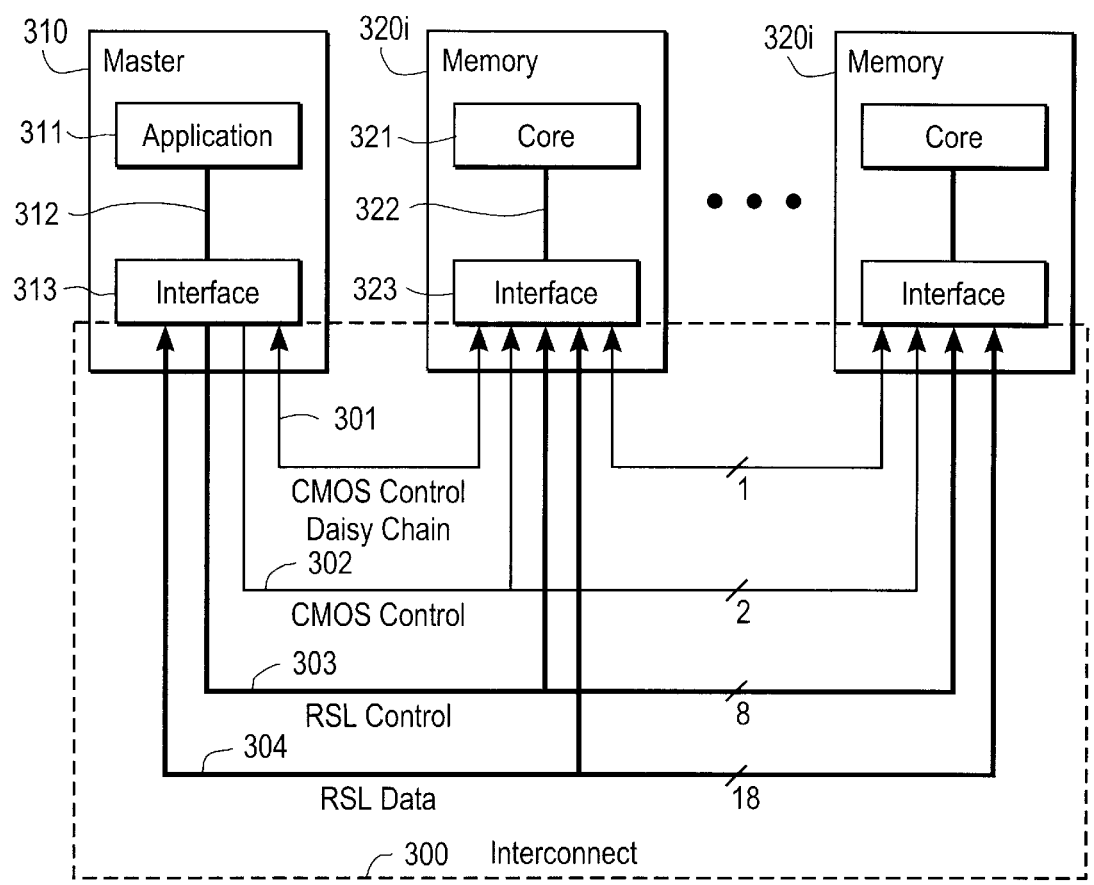
FIG. 1 is a high level block diagram of a memory system illustrating interconnect structure that may be used in accordance with the present invention.

An overall object of the present invention is to maximize the amount of information transferred across a limited number of interconnect wires in a given time interval. It is therefore necessary to describe an exemplary interconnect structure to illustrate the various techniques developed by the present invention. Referring to FIG. 1, shows a simplified block diagram of a memory system depicting an exemplary embodiment of an interconnect structure that can be advantageously employed for the purposes of the present invention. A master controller 310 controls the flow of address, data and control signals to and from several memory chips 320i over an interconnect structure 300. Interconnect structure 300 includes a single wire interconnect line 301 that carries control signals having CMOS logic levels, as well as a two-wire interconnect bus 302 that also carries control signals with CMOS logic levels. CMOS interconnect 301 connects master controller 310 and memory devices 320i in a daisy chained fashion, while CMOS interconnect bus 302 connects from controller 310 to each memory device 320i in a tree structure. Interconnect structure 300 further includes a high speed 8-wire control bus 303 and a bidirectional 18-wire data bus 304. Control and data buses 303 and 304 preferably use a special high speed Rambus signaling technique that is described in greater detail in "A 533 MBits/sec/wire Modular Bus," by Nimmagadda et al., 1996 Proceedings of the 46h Electronics Components & Technology Conference, p. 974. It is to be understood that the interconnect structure of FIG. 1 is used herein for illustrative purposes only and that the teachings of the present invention can be extended to other interconnect structures with different number of buses arranged in configurations with different widths, without departing from the scope of the present invention.

The transfer of information in the memory system of FIG. 1 is accomplished by transmitting multiple bits of data in successive frames of time. In one exemplary embodiment, the frame duration is set to 4 clock cycles and two bits of data are transferred per clock cycle (one bit corresponding to each edge of the clock). Each frame according to one embodiment is made up of two packets having predefined sizes. A packet refers to several bits of data that have a well-defined relationship in time and across multiple interconnect wires. According to one embodiment, the high speed 8-wire control bus 303 is divided into a first group of three wires that carry a primary control packet (PCP) and a second group of five wires that carry a secondary control packet (SCP).

FIG. 2 illustrates a generalized version of the exemplary frame defining the relationship in time across wires for the two packets PCP and SCP. The eight wires of control bus 303 are labeled RQ[0] to RQ [7], with RQ[0]–RQ[4] constituting the SCP and RQ[5]–RQ[7] constituting PCP. As shown in FIG. 2, within the four cycles, there are a total of 24 bits that carry control information in the PCP and 40 bits that carry control information in the SCP.

The various techniques of the present invention are described hereinafter in the context of the above exemplary embodiment for an interconnect structure and data transfer protocol to illustrate how the amount of information transferred in a given time period is maximized according to the present invention. Application of the teachings of the present invention to other interconnect structures (e.g., varying organization of the interconnect buses) using different transfer protocols (e.g., frames and packets with different sizes) and transferring different types of information (e.g., information other than control signals such as memory data) will be obvious to one of skill in the art.

A first aspect of the present invention that improves bandwidth relates to reducing the total number of bits required for addressing memory cells inside a memory device by merging two or more address fields. A conventional memory device is typically made up of several individual banks of memory each including an array of storage cells located at intersections of rows and columns. A DRAM, for example, may be organized into 64 banks each having 4096 rows of memory cells. To address a specific storage cell in a particular device, therefore, both a 6-bit bank address and a 12-bit row address are required. A separate column address is further required to select one of a plurality of columns. In a memory system having multiple memory devices (e.g., 32) such as the one shown in FIG. 1, a device address (e.g., 5 bits) is also necessary to identify a particular device. The prior art has typically allocated independent and separate address fields to identify a device, a bank, a row and a column. In contrast, the present invention combines two or more of these address fields into a single unified address field reducing the overall number of bits required.

Allocating independent address fields for bank and row addresses for the above exemplary DRAM, as is typically done by the prior art, would require a total of 18 bits. In a preferred embodiment, the present invention merges the bank address and the row address into a unified address field that requires fewer bits. To accommodate memory devices having different configurations, the present invention supports variable sized address fields for bank and row. In one embodiment, the present invention supports bank address fields having a minimum of three bits to a maximum of six bits, and row address fields having a minimum of nine bits to a maximum of twelve bits. A memory configuration (i.e., number of banks and size of each bank) is typically governed by a number of factors including memory density (total number of memory cells), I/O organization, and circuit layout considerations, among others. Due to such design constraints, certain configurations are not practical and therefore their particular addressing combination need not be supported. The present invention recognizes and takes advantage of this fact which allows compression of address fields into fewer bits.

One example of address field compression according to the present invention is shown in FIG. 3. FIG. 3 is a table that illustrates field positions for 14 different memory device configurations with a 3 to 6-bit bank address (bits b[0] to b[5]) and 9 to 12-bit row address (bits r[0] to r[11]) merged into a unified 17-bit address field A[0] to A[16]. This example assumes that at no time will both maximum field sizes (6-bit bank address and 12-bit row address) appear in combination and thus this combination need not be supported. As shown in FIG. 3, the bank address is reversed and packed such that the least significant bit of the bank address corresponds to the most significant bit of the unified address. This ensures that the bank field position is consistently aligned for the various configurations, reducing the complexity of the requester's (e.g., master controller's) circuitry to form the request (i.e., the address). This example, therefore, conserves control bandwidth by reducing the number of bits required for addressing from 18 to 17. The technique of the present invention can be utilized to further compress the address fields (i.e., reduce total number of required bits by two or more) in other embodiments involving different memory configurations.

Figure 4:
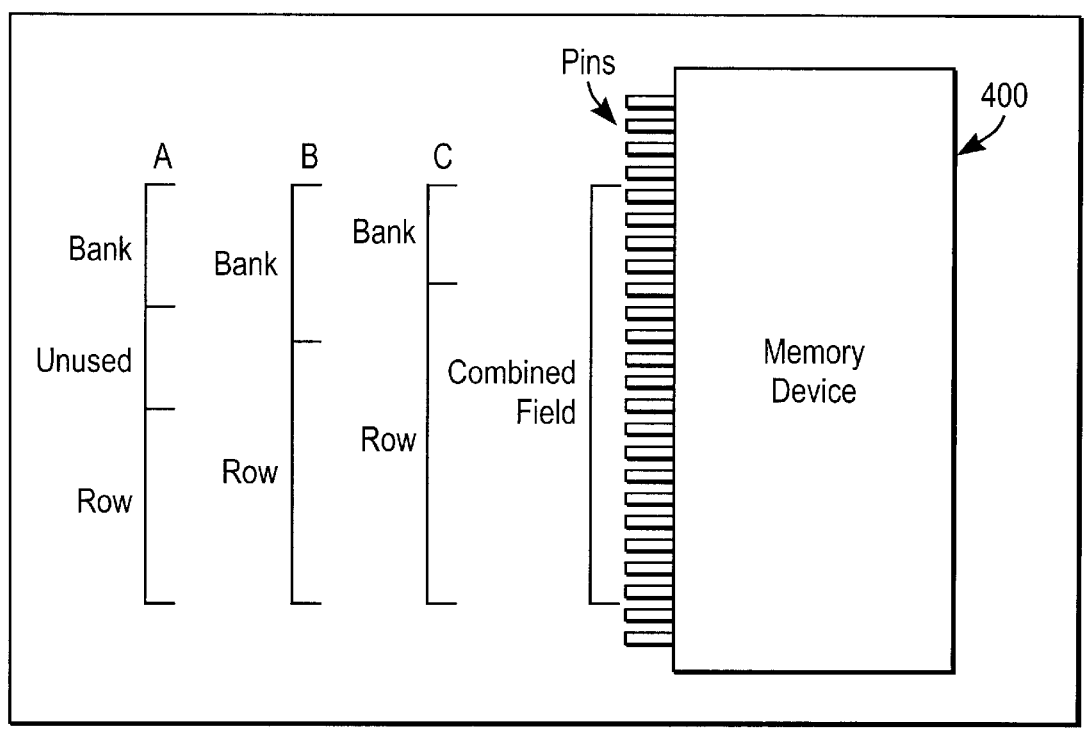
FIG. 4 shows the technique of combining bank and row address fields according to one embodiment of the present invention as applied directly to pins of a memory device.

In an alternate embodiment, the address field compression technique of the present invention is applied directly to the pins of a memory device. FIG. 4 shows the technique of combining bank and row address fields as applied directly to pins of a memory device 400. In this example, the maximum number of bits required to independently address banks and rows is 20 (e.g., 3 to 6-bit bank address and 10 to 14-bit row address). The combined address field according to the compression technique of the present invention is an 18-bit field instead of a 20-bit field. This translates to a reduction of required address pins by two. FIG. 4 shows how the 18-bit combined field may be used differently for three different combinations A, B, and C of the row and bank addresses for three different configurations.

It is to be understood that the above exemplary embodiments select row and bank address with specific widths for illustrative purposes only, and that the teachings of the present invention to share or combine bits to arrive at a compressed field can be applied to control information other than address fields. Further, the combined control field may have more than two sub-fields (e.g., row, bank and device addresses), and each sub-field alignment can be chosen differently. Moreover, the present invention is not limited to any specific mapping of the various control bits within the combined field. For example, the positions of the bits within the combined field or the sub-fields need not be contiguous physically, or contiguous in time.

Another aspect of the present invention that improves bandwidth relates to various methods of maximizing the amount of control information that is packed inside a single frame such as the one shown in FIG. 2. As described in connection with the operation of the memory system of FIG. 1, information transfer takes place in successive data frames. Therefore, identifying the boundaries of (or establishing) a frame is among the many control functions that must be performed. In one embodiment of the memory system of FIG. 1, there are extensive power management provisions made in order to reduce power consumption. There are modes of operation wherein a number of pins of devices including some connected to several wires of control bus 303, as well as some internal circuitry and clock circuitry associated with them are disabled and placed in standby to conserve power. Upon resuming power, the alignment or framing of the multi-cycle control packets must be established for proper operation of the system. Therefore, certain bits within each frame must be dedicated for the purposes of establishing framing. Because the system may enter such standby mode rather frequently, it is important to devise a bandwidth efficient framing mechanism.

In one embodiment of the present invention, framing is established by a multi-bit field in the secondary control packet SCP. As described above in connection with the exemplary embodiment of the memory system of FIG. 1 and the exemplary frame shown in FIG. 2, the SCP falls across control wires RQ[0] to RQ[4].

FIG. 5 shows a first example of an SCP with a relatively simple framing mechanism. In this example, the four bits made up of the first bit of each of the four cycles are used to signal the beginning of a frame. As shown in FIG. 5, the only one of the four bits asserted (i.e., logic "1") is the first bit of the first cycle S3 (Bit 0 of SCP in FIG. 2), and the remaining bits S2, S1 and S0 are kept at "0". This assignment allows the receiver of the control packet to scan for a "1" to indicate the start of the packet. That is a 1000 indicates the presence of a packet, and 0000 signals no packet. While this scheme works well and simplifies the receiver's task, it is quite inefficient in that only two of the 16 binary encodings of the four bits are utilized.

FIG. 6 shows another control packet illustrating an alternative, more bandwidth efficient framing scheme. In the embodiment of shown in FIG. 6, the same four bit positions are used, but more information is encoded into the four bits. Bits S1 and S2 of the four bits are used as partial opcode bits POP[0] and POP[1], respectively. The partial opcode field is assigned using only three of the four possible binary encodings for the two bits: 00, 10 and 11. The remaining pattern 01 is reserved, because it presents the same cycle to cycle pattern as the end of one packet and the beginning of another packet, and the same pattern as no packet (all zeros) and the start of a packet. This encoding allows the system to scan for the pattern 01, which when detected, unambiguously detects a 1 as the start of a packet. Thus, the use of the encoding for the four bits has been increased, so that four of 16 possibilities are utilized (0000, 1000, 1100, and 1110). This provides for larger overall control capability when used in combination with all other bit positions in the control packet. The technique of this embodiment is readily extendible to multi-cycle controls of different lengths. Also, different bit patterns may be used, such as inverting the polarities of the bits in the example.

Yet another method to establish framing according to a preferred embodiment of the present invention is based on a built-in delay mechanism to ensure the beginning of a frame occurs after detection of a reliable clock signal. This embodiment requires only a single start bit to signal framing.

Figure 7:
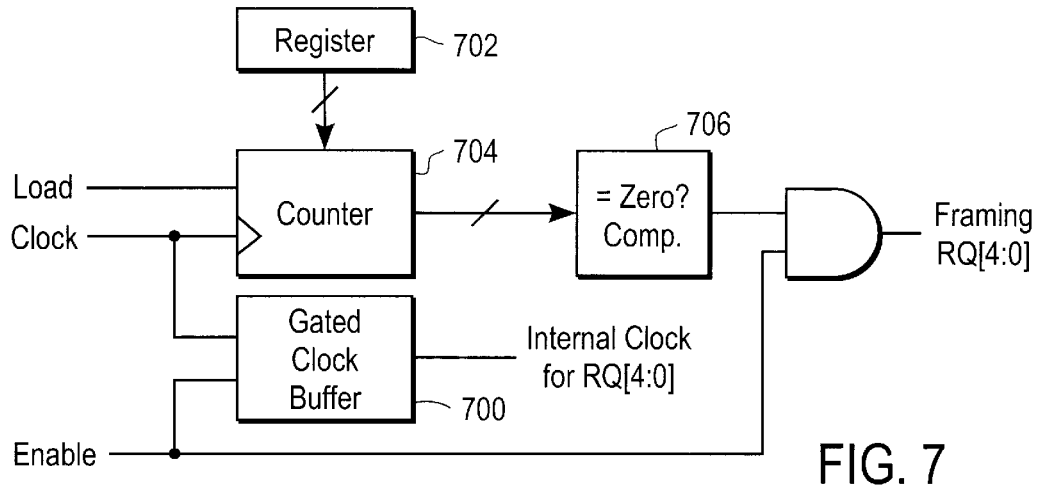
FIG. 7 is a simplified block diagram of an exemplary implementation for the circuitry to establish framing according to another embodiment of the present invention.

FIG. 7 is a simplified block diagram of an exemplary implementation for the circuitry that accomplishes the framing task according to this embodiment. The operation of the circuit of FIG. 7 is described in connection with the timing diagram of FIG. 8. In this embodiment, framing of the SCP is referenced to the beginning of the PCP that guarantees the start of an internal clock. When a PCP is received on RQ[7:5], framing of SCP on RQ[4:0] is started, and a gated clock buffer 700 that generates the internal clock for receiving and operating on SCPs on RQ[4:0], is enabled. A delay offset from the start of the PCP is necessary before SCPs can be reliably received. The framing circuit of FIG. 7 includes a register 702 that is initialized to a value that provides the desired offset between the enabling packet (PCP) on wires RQ[7:5] and the packet to be framed (SCP) on wires RQ[4:0]. A counter 704 is preset by the contents of register 702 and counts down to zero. Block 706 compares the state of counter 704 to zero and when it detects that the counter has reached zero it generates an output signal that is combined with the enable signal to produce the 1-bit framing signal that allows packet recognition to begin.

The delay offset programmed into register 702 must be no less than the delay it takes gated clock buffer 700 to generate a reliable clock. Also, a packet on RQ[4:0] must not straddle cycles before and after the beginning of framing, which would allow the device to interpret some other field as the beginning of a packet and perform errant operations and misframe subsequent packets. This is better understood with reference to the waveforms in the timing diagram of FIG. 8.

Figure 8:
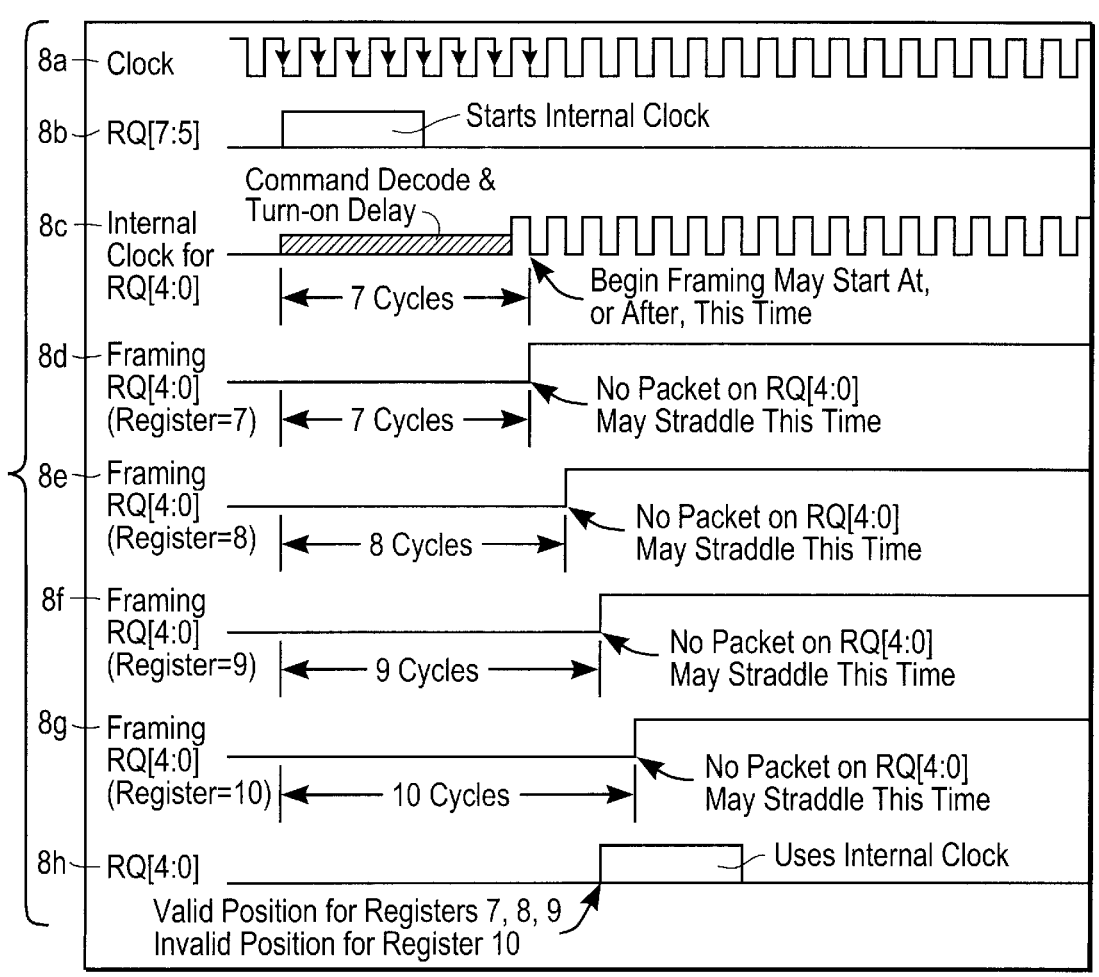
FIG. 8 is a timing diagram illustrating the operation of the framing circuit of FIG. 7.

FIG. 8 shows the timing of the framing signal assertion for various register settings that correspond to 7, 8, 9 and 10 cycles. Waveform 8a is the clock signal and waveform 8b shows the start of the internal clock for the PCP on wires RQ[7:5]. Waveform 8c, illustrates a condition where gated clock buffer 700 takes an exemplary 7 cycles to generate a reliable clock as measured from the beginning of the packet on RQ[7:5]. Thus, a register preset value corresponding to 7 cycles is the minimum valid setting for this example. Waveforms 8d, 8e, 8f and 8g show the timing of framing signal assertion for register values corresponding to 7, 8, 9 and 10 clock cycles, respectively. Finally, waveform 8h shows a condition where a packet on RQ[4:0] is positioned at cycle 9, as measured from the beginning of the packet on RQ[7:5]. For the packet on waveform 8h, only register settings corresponding to 7, 8 and 9 cycles are acceptable. If register 702 is initialized to the value corresponding to 10 cycles, the packet would straddle the timing of the framing signal. Further, in the case where the packet on RQ[4:0] is one of a series of successive back-to-back packets, then only register value of 9 would be valid.

This embodiment contemplates including the framing circuitry, only one example of which is shown in FIG. 7, inside each memory device. Other circuit implementations for the single bit framing embodiment will be known to those skilled in the art. The teachings of the present invention with respect to this particular embodiment are therefore not limited to the counter-based circuit of FIG. 7.

In one embodiment of the present invention, further compression techniques are utilized to pack more control information into the exemplary 40-bit SCP field. In addition to the start bit, the SCP must carry the device address which for a system having 32 memory devices would be a 5-bit field, a mask field when there is masking operation to be performed, memory precharge information (for memory devices such as DRAMs that require precharging), among other functions. In multibyte transfers containing large amount of data, the system allows the user to selectively write certain portions of the data. Masking refers to the operation of identifying those portions of data on a bit-by-bit or byte-by-byte basis that are not to be written into a memory device in a particular cycle. If there are, for example, 16 bytes in each transfer, there may be 16 bits in the mask field each signaling whether a given byte is to be masked or not. However, not every transfer involves a masking operation. Thus, one 16-bit field that is otherwise dedicated to the masking operation becomes available during a transfer that does not involve a masking operation. The present invention takes advantage of this fact by using the bit that signals whether there is mask operation or not, to carry extra operation codes when there is no mask.

FIGS. 9a and 9b illustrate exemplary packings for an SCP with a mask field with mask address, and an SCP with the mask field packed with extra opcodes, respectively, according to one embodiment of the present invention. Two main features of the present invention, field position optimization and field overloading, will be described hereinafter in connection with the exemplary packets shown in FIGS. 9a and 9b. In both SCPs, for the first half of the first cycle (Cycle 0) all five wires RQ[0:4] carry the device address DC[4:0]. The earliest provision of the device address allows for the time consuming compare operation inside each device to identify the addressed device. It is desirable to establish framing within the first cycle to avoid speculative frame counters. Thus, in the second half of Cycle 0, the RQ[4] position is devoted to the start bit "S" that signals the start of the SCP. Next, the mask bit "M" is placed in the RQ[3] position within the second half of Cycle 0. An asserted mask bit (M=1) signals the transfer of mask information. This is shown in FIG. 9a, wherein most of the positions in Cycles 1 and 2 are filled by 16 mask address bits MA[7:0] and MB[7:0]. When the mask bit is at zero (M=0), this field becomes available for extra opcodes, as described below. Because the mask bit has a major impact on how the SCP fields are interpreted, this bit is also positioned in the first cycle at RQ[3] position.

Other fields within the SCP that are common to both masked and unmasked transfers include column operation codes COP[1:0] that control column operations inside a selected memory device. To minimize latency on column operations, these bits are positioned in the second half of cycle 0 at RQ[2:1]. An exemplary encoding for these two bits is shown in Table 1 below.

TABLE 1

| COP[1] | COP[0] | Operation |
|---|---|---|
| 0 | 0 | No column operation |
| 0 | 1 | Write operation |
| 1 | 1 | Read operation |
| 1 | 0 | Reserved (no explicit or implicit operation) |

The remaining position RQ [0] in the second half of cycle 0 is occupied by the precharge bit PC. When asserted (i.e., PC=1), the precharge bit signals the addressed device of the DC field to perform a precharge operation at a time to coincide with the completion of any read or write operation. When PC is zero, no precharge operation is preformed. A 7-bit column address field AC[6:0] carries column address information and is positioned at the very end of the packet (Cycle 3) in order to maximize the time the master controller has for address manipulation before communicating onto the channel for column operations. Similarly, a 6-bit bank address filed BC[5:0] is positioned toward the end of the packet, as shown in both FIGS. 9a and 9b. The one other bit that is common to both masked and unmasked transfers in the SCP relates to power management and is labeled as RC denoting a "relax" to a standby mode of operation, which is a power saving feature.

When the mask bit M is zero (i.e., no masking operation is to be performed), the 16 mask address bits become available for extra operations, an exemplary field positioning for which is shown in FIG. 9b. The earliest five bits (first half of Cycle 1) are used to address the extra device (DX[4:0]), wherein the extra operation is to be performed. That is followed by a 5-bit opcode XOP[4:0] defining the extra operation. The remaining portion of the extra field is occupied by a 6-bit extra bank address BX[5:0]. The five XOP bits can signal up to 32 additional control functions. Given such a large bonus field for extra control operation, the encoding of the XOP bits may be done in a sparse fashion to simplify the decoding function. By thus overloading the SCP field and optimizing the positioning of the various controls, the present invention maximizes efficiency and control bandwidth.

Similar techniques are employed by the present invention to overload, when appropriate, and optimize the field positioning within the primary control packet (PCP). Most of the exemplary 24-bit PCP field as shown in FIG. 2, is occupied by address bits for bank and row addresses when a row in a given device is being activated. The PCP, according to one embodiment of the present invention, also carries control information including device address, framing information, broadcast and other control information. Among the various other control information packed into the PCP, one is the identification of each one of the several memory devices 320i in the exemplary system shown in FIG. 1. Again, for a system having 32 memory devices, there will be a 5-bit code required to identify each device. There will be at least one bit required to signal the framing information for each PCP. Another bit may be required to signal a broadcast operation (i.e., packet intended for all memory devices on the channel).

One example of overloading of control information in the PCP to maximize control bandwidth according to the present invention, combines device address, framing and broadcast control bits into a merged 6-bit field. FIG. 10a shows one example of field positioning for a primary control packet PCP. The first cycle across the three wires RQ[7:5] is occupied by the 6-bit merged field. Framing and broadcast controls are encoded into the first two positions designated by D4T and D4F. D4T and D4F also form part of the device address. One example of such encoding is shown in Table 2 below.

TABLE 2

| D4T | D4F | Description |
|---|---|---|
| 0 | 0 | No packet |
| 0 | 1 | Start packet with device address MSB = 0 |
| 1 | 0 | Start packet with device address MSB = 1 |
| 1 | 1 | Start packet and Broadcast |

The remaining four bits D[3:0] form the rest of the device address. Note that in the case of a PCP that is being broadcast the device address is irrelevant since the packet is sent to all devices on the channel. It is to be understood that the above encoding is but an illustrative example, and variations are possible. For example, instead of broadcast, other control functions such as those relating to power management features (e.g., transfer between power levels such as power down and standby, or relax and nap, etc.) may be signaled by the combination of D4t and D4F. The device address field is positioned in the very first cycle for the same reason as in the case of an SCP, namely to allow time for the decode and compare function performed by each device.

The PCP includes one bit "AV" that signals whether during this transfer a row is being activated within a device. When AV=1, signaling a transfer involving row activation, the remaining positions in the PCP are occupied entirely by the target bank and row addresses. In the example shown in FIG. 10b, a 17-bit (A[16:0]) merged bank and row address field is used, as described in connection with FIGS. 3 and 4.

When AV=0, this signals that the PCP transfer does not involve activation of a row and therefore bank and row addresses are not required. This frees up the 17-bit merged address field and allows more control operations to be encoded within the PCP. FIG. 10a shows an exemplary field positioning for a PCP wherein a row is not being activated (i.e., AV=0). In the example shown in FIG. 10a, the first 6 bits in Cycle 1 are occupied by bank address A[16:11] and the rest of the PCP is occupied by opcodes OP[10:0]. Thus, the AV bit acts essentially as an identifier for the packet format. This bit should preferably occur early in the opcode field since its status identifies the type of PCP, but after the device address to allow for the device address comparison operation. The AV bit is thus positioned in the first half of Cycle 2 on wire RQ[5] which also balances the fanout between the three wires (with RQ[7:6] carrying the D4T and D4F signals).

There are a variety of control functions that can be assigned to the 11 opcode bits. Table 3 lists one example of opcode encoding for the PCP that includes combinations of precharge and refresh commands as well as a variety of power saving commands (Powerdown, Standby, Relax, Nap, etc.). According to this exemplary embodiment of the present invention, at least two factors have governed the encoding of the PCP opcodes. One is ease of implementation that results in sparse encoding to allow one or two bit decode for most operations. Another is optimization of field positioning that results in positioning decodes that affect row operations in earlier cycles to keep same operational reference points as-when activating a row.

TABLE 3

| AV | 10 | 9 | 8 | 7 | 6 | 5 | 4 | 3 | 2:0 | Description |
|---|---|---|---|---|---|---|---|---|---|---|
| 1 | x | x | x | x | x | x | x | x | x | Active Row |
| 0 | 1 | 1 | 0 | 0 | 0 | 0 | 0 | 0 | 0 | Precharge |
| 0 | 1 | 0 | 0 | 0 | 0 | 1 | 0 | 0 | 0 | Precharge & Nap |
| 0 | 1 | 0 | 0 | 0 | 0 | 1 | 0 | 1 | 0 | Precharge & Nap & Relax |
| 0 | 1 | 0 | 0 | 0 | 0 | 1 | 1 | 0 | 0 | Precharge & Conditional Nap |
| 0 | 1 | 0 | 0 | 0 | 0 | 1 | 1 | 1 | 0 | Precharge & Conditional Nap & Relax |
| 0 | 1 | 0 | 0 | 0 | 0 | 0 | 1 | 0 | 0 | Precharge & Powerdown |
| 0 | 1 | 0 | 0 | 0 | 0 | 0 | 1 | 1 | 0 | Precharge & Powerdown & Relax |
| 0 | 1 | 0 | 0 | 0 | 0 | 0 | 0 | 1 | 0 | Precharge & Relax |
| 0 | 0 | 0 | 0 | 1 | 1 | 0 | 0 | 0 | 0 | Refresh |
| 0 | 0 | 0 | 0 | 1 | 1 | 0 | 0 | 1 | 0 | Refresh & Relax |
| 0 | 1 | 0 | 1 | 0 | 1 | 0 | 0 | 0 | 0 | Precharge Postrefresh |
| 0 | 1 | 0 | 1 | 0 | 1 | 0 | 0 | 1 | 0 | Precharge Postrefresh & Relax |
| 0 | 0 | 0 | 0 | 0 | 0 | 1 | 0 | 0 | 0 | Nap |
| 0 | 0 | 0 | 0 | 0 | 0 | 1 | 0 | 1 | 0 | Nap & Relax |
| 0 | 0 | 0 | 0 | 0 | 0 | 1 | 1 | 0 | 0 | Conditional Nap |
| 0 | 0 | 0 | 0 | 0 | 0 | 1 | 1 | 1 | 0 | Conditional Nap & Relax |
| 0 | 0 | 0 | 0 | 0 | 0 | 0 | 1 | 0 | 0 | Powerdown |
| 0 | 0 | 0 | 0 | 0 | 0 | 0 | 1 | 1 | 0 | Powerdown & Relax |
| 0 | 0 | 0 | 0 | 0 | 0 | 0 | 0 | 1 | 1 | Relax |
| 0 | 0 | 0 | 0 | 0 | 0 | 0 | 0 | 0 | 0 | No Op (reserved) |

Yet another method to for conserving control bandwidth according to the present invention is to establish and use a tag field with fewer bits as a substitute for an otherwise larger device address field. Because at least one field must be dedicated to device address in each packet (two fields in the case of an unmasked SCP as shown in FIG. 9b), maximum efficiency in the signaling of device address is desirable. According to this embodiment of the present invention, one packet establishes the tag that is associated with the fully addressed device. The tag has a limited duration, and specific mechanisms are provided to end the use of a particular tag.

FIG. 11a shows one example of a control packet with an exemplary S-bit device address field "D", which establishes a 3-bit tag for a compressed device identifier in the field "CD". Other positions in the packet may or may not signal other control functions. Once the tag is established subsequent control packets may use the compressed device identifier in their "CD" field. FIG. 11b shows another control packet that uses the 3-bit tag in the CD field to save 2 bit positions when compared to using an uncompressed 5 bit device address field. In other applications, the magnitude of the compression may be chosen differently, with as little as one bit compression or all except one bit, as would best benefit the application. This embodiment, requires each memory device to include an internal register that hold the compressed address plus a valid bit.

In conclusion, the present invention provides various techniques for optimized transfer of information in electronic systems involving memory devices to increase the data bandwidth. These techniques include merging of two or more control fields (e.g., address fields) to reduce the total number of control signals, using a delay mechanism to establish the framing of one set of signals based on the framing of another set of signals, encoding multiple control functions into fewer bits to further conserve control bandwidth, overloading signal functionality by using the same bits to perform different functions in different modes of operation. Various other advantageous techniques relating to positioning of control signals within a given set of signals and encoding schemes have also been disclosed.

While the foregoing provides a complete description of several embodiments of the present invention, it is possible to use various alternatives, modifications and equivalents. For example, the size of the various control fields as well as the signaling convention (i.e., logic 0 and 1) as used in the above description are arbitrary and other sizes and conventions may also be used. Also, functions assigned to various opcode fields are illustrative in nature and not limiting. Similarly, while a DRAM was used an example of a typical memory device used within the system of the present invention, the teachings of the invention apply to other types of memory devices including static random access memories (SRAMs), read only memories (ROMs), electrically erasable read only memories (EEPROMs), as well as Flash type memories, and the like.

Therefore, the scope of the present invention should be determined not with reference to the above description but should, instead, be determined with reference to the appended claims, along with their full scope of equivalents.

What is claimed is:

1. An electronic device comprising memory circuitry, said memory circuitry configured to receive operating information carried by a plurality of packets, each packet comprising a plurality of bits of information, wherein, a select sub-group of said plurality of bits of information in a packet carries information of a first type during a first mode of operation, and information of a second type during a second mode of operation, wherein said select sub-group of said plurality of bits carries mask information for a masked operation in response to a mask bit having a first logic state, and wherein, said select sub-group of said plurality of bits carries control information other than mask information when said mask bit has a second logic state.

2. The electronic system of claim 1 wherein said control information other than mask information comprises address information for addressing other memory circuitry, and extra operation codes for performing select operations in said other memory circuitry.

3. The electronic system of claim 1 wherein said plurality of bits of information in each said packet span over successive clock cycles and across multiple interconnect wires of said memory circuitry and said mask bit is positioned before said select sub-group of said plurality of bits in said packet.

4. The electronic system of claim 1 wherein said control information other than mask information comprises a bank address of a memory bank in said memory circuitry.

5. An electronic device comprising memory circuitry, said memory circuitry configured to receive operating information carried by a plurality of packets, each packet comprising a plurality of bits of information, wherein, a select sub-group of said plurality of bits of information in a packet carries information of a first type during a first mode of operation, and information of a second type during a second mode of operation, wherein said select sub-group of said plurality of bits carries address information necessary to address a row of memory cells in said memory circuitry in response to a row activate bit having a first logic state, and wherein, said select sub-group of said plurality of bits carries information other than said address information necessary to address a row of memory cells when said row activate bit has a second logic state.

6. The electronic system of claim 5 wherein said information other than said address information comprises
address information for addressing other memory circuitry; and
extra operation codes for performing select operations in said other memory circuitry.

7. The electronic system of claim 5 wherein said plurality of bits of information in a packet span over successive clock cycles and across multiple interconnect wires of said memory circuitry.

8. The electronic system of claim 7 wherein said select sub-group of said plurality of bits further comprises a first sub-group of bits and a second sub-group of bits and said row activate bit is positioned between said first group of bits and said second group of bits and said first group of bits carry a bank address of a bank of memory cells in said memory circuitry.

9. The electronic system of claim 5 wherein said select sub-group of said plurality of bits further comprises a first sub-group of bits and a second sub-group of bits and said row activate bit is positioned between said first group of bits and said second group of bits and said first group of bits carry a bank address of a bank of memory cells in said memory circuitry.

10. The electronic system of claim 9 wherein said second group of bits carry a row address of a row of memory cells in said bank of memory cells when said row activate bit has said first logic state.

11. The electronic system of claim 10 wherein said second group of bits carry control information when said row activate bit has said second logic state.

12. The electronic system of claim 11 wherein said control information comprises one or more commands selected from the group consisting of precharge, refresh and power saving commands.

13. The electronic system of claim 11 wherein, for a subset of said plurality of packets, said control information comprises two commands selected from the group consisting of precharge, refresh and power saving commands.

14. A method of communicating with a memory device, comprising the steps of:

receiving at a memory device operating information in the form of packets with each packet comprising a plurality of bits of information;

designating a select sub-group of said plurality of bits of information in a packet to carry information of a first type during a first mode of operation; and designating said select sub-group of said plurality of bits of information in said packet to carry information of a second type during a second mode of operation;

wherein said step of designating during the first mode of operation comprises a step of defining said first mode of operation as a masked operation in response to a mask bit having a first logic state, and wherein, said step of designating during the second mode of operation comprises a step of defining said second mode of operation as an operation other than a masked operation in response to said mask bit having a second logic state.

15. The method of communicating with a memory device as set forth in claim 14 wherein said operation other than the masked operation comprises addressing other memory circuitry, and performing select operations in said other memory circuitry.

16. The method of communicating with a memory device as set forth in claim 14 wherein said plurality of bits of information in a packet span over successive clock cycles and across multiple interconnect wires of said memory device and said mask bit is positioned before said select sub-group of said plurality of bits in said packet.

17. The method of communicating with a memory device as set forth in claim 14 wherein said select sub-group of said plurality of bits carry a bank address of a memory bank in said memory device during said operation other than a masked operation.

18. A method of communicating with a memory device, comprising the steps of:

receiving at a memory device operating information in the form of packets with each packet comprising a plurality of bits of information;

designating a select sub-group of said plurality of bits of information in a packet to carry information of a first type during a first mode of operation; and designating said select sub-group of said plurality of bits of information in said packet to carry information of a second type during a second mode of operation;

wherein said step of designating during the first mode of operation comprises a step of defining said first mode of operation as a memory row activate operation in response to a row active bit having a first logic state, and wherein, said step of designating during the second mode of operation comprises a step of defining said second mode of operation as an operation other than a memory row activate operation in response to said row activate bit having a second logic state.

19. The method of communicating with a memory device as set forth in claim 18 wherein said operation other than said memory row activate operation comprises addressing other memory circuitry, and performing select operations in said other memory circuitry.

20. The method of communicating with a memory device as set forth in claim 18 wherein said plurality of bits of information in a packet span over successive clock cycles and across multiple interconnect wires of said memory device.

21. The method of communicating with a memory device as set forth in claim 20 wherein said select sub-group of said plurality of bits further comprises a first sub-group of bits and a second sub-group of bits and said row activate bit is positioned between said first group of bits and said second group of bits and said first group of bits carry a bank address of a bank of memory cells in said memory device.

22. The method of communicating with a memory device as set forth in claim 15 wherein said select sub-group of said plurality of bits further comprises a first sub-group of bits and a second sub-group of bits and said row activate bit is positioned between said first group of bits and said second group of bits and said first group of bits carry a bank address of a bank of memory cells in said memory device.

23. The method of communicating with a memory device as set forth in claim 22 wherein said second group of bits carry a row address of a row of memory cells in said bank of memory cells during said memory row activate operation in response to said row activate bit having said first logic state.

24. The method of communicating with a memory device as set forth in claim 23 wherein said second group of bits carry control information in said bank of memory cells during said operation other than a memory row activate operation in response to said row activate bit having said second logic state.

25. The method of communicating with a memory device as set forth in claim 24 wherein said control information comprises one or more commands selected from the group consisting of precharge, refresh and power saving commands.

26. The method of communicating with a memory device as set forth in claim 24 wherein said control information comprises two commands selected from the group consisting of precharge, refresh and power saving commands.

\* \* \* \* \*

UNITED STATES PATENT AND TRADEMARK OFFICE
CERTIFICATE OF CORRECTION

PATENT NO. : 6,757,789 B2
DATED : June 29, 2004
INVENTOR(S) : Abhyankari et al.

It is certified that error appears in the above-identified patent and that said Letters Patent is hereby corrected as shown below:

Column 14,
Line 25, delete "15" and insert -- 18 --.

Signed and Sealed this

Tenth Day of August, 2004

JON W. DUDAS
*Acting Director of the United States Patent and Trademark Office*